US011220947B2

(12) United States Patent
Frehse et al.

(10) Patent No.: US 11,220,947 B2
(45) Date of Patent: Jan. 11, 2022

(54) METHOD FOR DETECTING THE ICING OF A PARTICULATE FILTER, ESPECIALLY OF A GASOLINE PARTICULATE FILTER

(71) Applicant: VOLKSWAGEN AKTIENGESELLSCHAFT, Wolfsburg (DE)

(72) Inventors: Chris Frehse, Sanitz (DE); Christoph Nee, Wolfsburg (DE); Sebastian Heinken, Braunschweig (DE); Hagen Müller, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 205 days.

(21) Appl. No.: 16/414,030

(22) Filed: May 16, 2019

(65) Prior Publication Data
US 2019/0353076 A1 Nov. 21, 2019

(30) Foreign Application Priority Data
May 16, 2018 (DE) ...................... 10 2018 111 788.4

(51) Int. Cl.
*F01N 3/023* (2006.01)
*F01N 11/00* (2006.01)
*F01N 9/00* (2006.01)

(52) U.S. Cl.
CPC ............ *F01N 11/002* (2013.01); *F01N 3/023* (2013.01); *F01N 9/00* (2013.01); *F01N 9/005* (2013.01);
(Continued)

(58) Field of Classification Search
CPC .. F01N 2570/22; F01N 2560/06; F01N 9/005; F01N 9/00; F01N 3/021; F01N 2900/1404
See application file for complete search history.

(56) References Cited

U.S. PATENT DOCUMENTS 5,590,521 A * 1/1997 Schnaibel ............... F02D 41/28
60/274
2006/0288693 A1* 12/2006 Endo ..................... F01N 3/0814
60/297
(Continued)

FOREIGN PATENT DOCUMENTS

CN 102782276 A 11/2012
CN 104061051 A 9/2014
(Continued)

OTHER PUBLICATIONS

Search report for German Patent Application No. 10 2018 111 788.4, dated Jan. 9, 2019.
(Continued)

*Primary Examiner* — Matthew T Largi
(74) *Attorney, Agent, or Firm* — Pearl Cohen Zedek Latzer Baratz LLP

(57) ABSTRACT

A method for detecting the icing of a particulate filter, especially of a gasoline particulate filter, includes determining the temperature of the exhaust gas flow flowing through the particulate filter, whereby icing of the particulate filter is detected on the basis of the determined temperature of the exhaust gas flow. The method is improved in that the temperature of the exhaust gas flow upstream from the particulate filter and the temperature of the exhaust gas flow downstream from the particulate filter are determined, whereby on the basis of the measured temperature difference, the heat input into the particulate filter and the quantity of water present in the particulate filter are determined, whereby the aggregates states of the water present in the particulate filter are calculated by drawing up a balance of the heat quantity.

11 Claims, 1 Drawing Sheet

(52) U.S. Cl.
CPC ...... *F01N 2560/06* (2013.01); *F01N 2570/22* (2013.01)

(56) References Cited

U.S. PATENT DOCUMENTS

| | | | |
|---|---|---|---|
| 2010/0300068 A1 * | 12/2010 | Enomoto | F02D 41/1494 60/273 |
| 2011/0151760 A1 | 6/2011 | Olsen | |
| 2013/0192699 A1 | 8/2013 | Nagaya et al. | |
| 2015/0218998 A1 * | 8/2015 | Ishihata | F01N 5/02 60/320 |
| 2015/0308315 A1 | 10/2015 | Faied et al. | |
| 2017/0058747 A1 | 3/2017 | Murata et al. | |

FOREIGN PATENT DOCUMENTS

| | | |
|---|---|---|
| CN | 104344622 A | 2/2015 |
| DE | 10 2006 028 701 A1 | 12/2006 |
| DE | 10 2014 209 960 A1 | 12/2014 |
| DE | 10 2015 201 495 A1 | 8/2015 |
| EP | 3165744 B1 | 12/2018 |
| JP | 2006/283579 A | 10/2006 |
| JP | 2008 190 341 A | 8/2008 |
| JP | 2013-155659 A | 8/2013 |
| JP | 2013/160208 A | 8/2013 |
| JP | 2013160208 A * | 8/2013 |

OTHER PUBLICATIONS

Office Action for Chinese Patent Application No. 201910406231.5, dated Nov. 30, 2020.

* cited by examiner

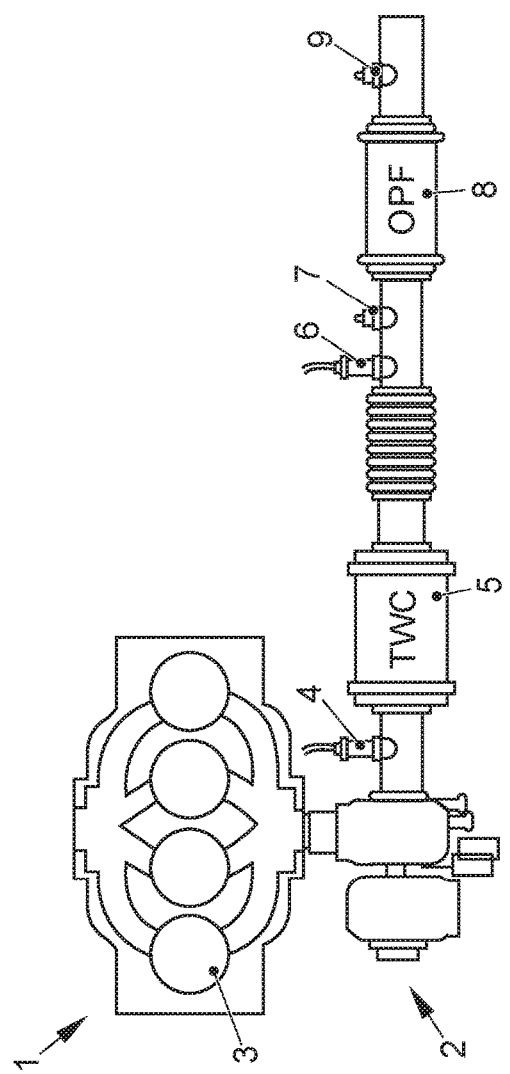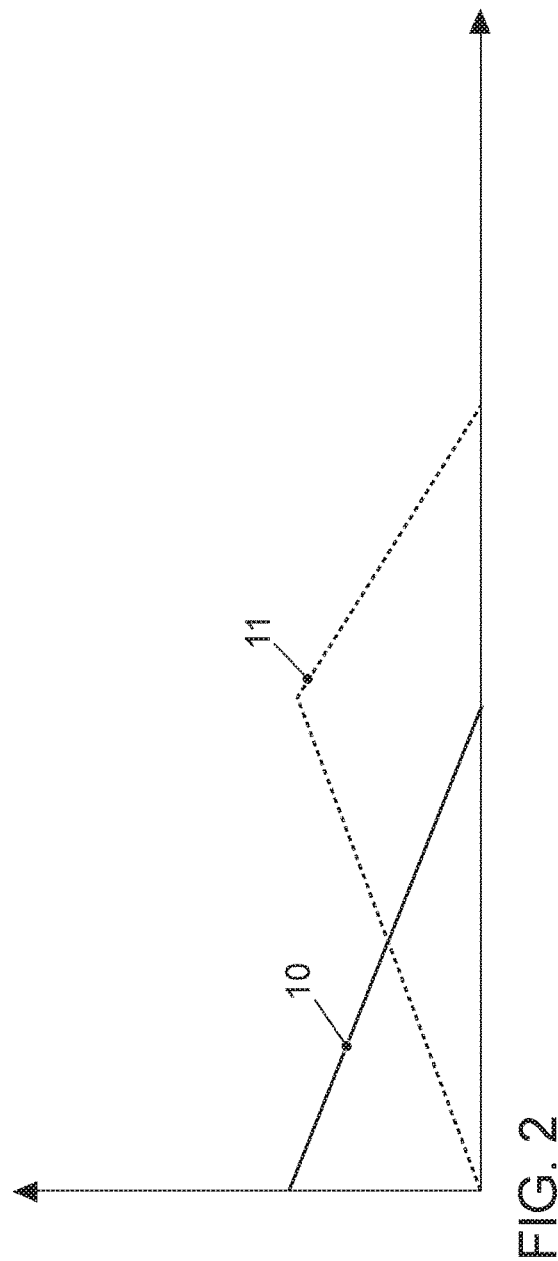

METHOD FOR DETECTING THE ICING OF A PARTICULATE FILTER, ESPECIALLY OF A GASOLINE PARTICULATE FILTER

CROSS-REFERENCE TO RELATED APPLICATIONS

This application claims priority from German Patent Application No. 10 2018 111 788.4, filed May 16, 2018, which is hereby incorporated by reference.

FIELD OF THE INVENTION

The invention relates to a method for detecting the icing of a gasoline particulate filter, having the features of the generic part of claim 1.

BACKGROUND OF THE INVENTION

When fuels are burned, process water is formed which collects in the components of the exhaust gas system if not enough heat is made available to discharge this water. When the ambient temperature drops, this water can freeze and the ice that is then present in the exhaust gas system can lead to a high exhaust gas counterpressure. If the internal combustion engine can no longer deliver the requisite expulsion work against the exhaust gas counterpressure, the motor stalls. The gasoline particulate filter has several substrate channels that are alternately closed. Since the gas has to diffuse through the wall, any icing in the substrate channels causes a disproportional increase in the flow resistance and, as a consequence, causes a high counterpressure.

German patent application DE 10 2015 201 495 A1 discloses a control device for the recovery of exhaust gas heat. This device has a heat recovery setting unit for setting the quantity of exhaust gas heat that has been recovered by the control device for the recovery of exhaust gas heat and it also has a control unit for controlling the heat recovery setting unit. This is meant to prevent or suppress freezing in the exhaust pipe. For this purpose, the driving history of the vehicle is evaluated and the freezing in the exhaust pipe is predicted. For example, if it is ascertained on the basis of the driving history that freezing will occur, then the freezing in the exhaust pipe can be countered in advance in that the heat recovery setting unit is actuated in such a way that the quantity of recovered exhaust gas heat is reduced or limited. In contrast, if it is ascertained on the basis of the driving history that freezing will not occur, then more exhaust gas heat can be recovered. The control unit is connected to a water temperature sensor and to an outside air temperature sensor. The control unit controls the heat recovery setting unit on the basis of the detected results obtained from the water temperature sensor and from the outside air temperature sensor. A comparison is made as to whether the lapsed driving time, as the driving history, is less than or equal to a prescribed reference time. If the lapsed driving time is less than or equal to the prescribed reference time, then there is a corresponding high probability that the inside of the exhaust pipe will freeze.

Japanese published unexamined patent application JP 2006/283579 A likewise discloses the control of a heat recovery unit as a function of the ambient temperature. The thermal energy is recovered from the exhaust gas flow by means of a heat exchanger. The ambient temperature and the exhaust gas temperature are measured. If the ambient temperature falls below 0° C., then it is predicted that the process water in the exhaust gas system will freeze. Moreover, the cooling water temperature is measured and taken into account.

The generic Japanese published unexamined patent application JP 2013/160208 A discloses methods to determine whether water is present in a particulate filter in frozen form or in liquid form. The differential pressure upstream and downstream from the particulate filters is measured. A temperature sensor measures the exhaust gas temperature of the particulate filter. On the basis of these two measured values, it is ascertained whether ice or water is present in the particulate filter. When the water in the particulate filter freezes, the differential pressure rises, as a result of which icing is detected.

SUMMARY OF THE INVENTION

The invention is based on the objective of improving the method.

The objective on which the invention is based is achieved by a method having the features of the claims.

In a preferred embodiment, a first temperature sensor measures the temperature of the exhaust gas flow upstream from the particulate filter and a second temperature sensor measures the temperature of the exhaust gas flow downstream from the particulate filter. On the basis of the measured temperature difference, the heat input into the particulate filter and the heat input into the water in the particulate filter are determined, whereby the momentary aggregate states of the water in the particulate filter are determined.

As an alternative, the temperature of the exhaust gas flow upstream from the particulate filter and/or the temperature downstream from the particulate filter can be determined by means of a model. In particular, the temperature of the exhaust gas flow upstream from the particulate filter can be calculated by means of a model and the temperature downstream from the particulate filter can be measured by means of a temperature sensor. In this embodiment, there is only one temperature sensor.

Preferably, the volumetric flow through the particulate filter is detected, and this is likewise used to calculate the heat input. The greater the volumetric flow, the higher the input of energy into the particulate filter.

The quantity of water present in the particulate filter is determined, whereby the water is differentiated in terms of its aggregate states. Here, the physical parameters for feeding water into and removing water from the exhaust gas system are calculated. The method is based on a model approach with which the momentary aggregate states of the water can be determined in parallel. A balance is drawn up of the heat quantity, whereby the energy input into the individual aggregate states is calculated. Owing to the drawn-up balance of the heat quantity, the water values can be associated with the aggregate states and converted into each other. In particular, this method is carried out continuously and thus also takes into account prolonged cooling off phases in which changes in the aggregate state can occur. Preferably, the standstill time of the vehicle is determined and taken into account in the determination of the aggregate states.

In particular, the ambient temperature is determined, whereby, for example, after a prolonged standstill time of the vehicle at an ambient temperature above 0° C., it can be assumed that there is no ice in the particulate filter.

Prescribed parameters can generate appropriate information entries for a repair shop so that any customer complaints can be more readily identified. A thermodynamic assessment of the aggregate states is carried out in the model, which permits the creation of an empirical parameterization, along with an improvement in accuracy. The method allows an accurate determination of the point in time when the water in the exhaust gas system has at least completely liquefied. This is achieved in that the previously calculated quantity of water in the particulate filter is differentiated in terms of its possible aggregate states by using thermodynamic calculation principles. These principles relate to thermodynamic energy conversion processes and are described as thermodynamic states.

The energy requirement for a given temperature change until there is a change in the aggregate state can be calculated by the product obtained from the specific thermal capacity c of ice or water, depending on which aggregate state prevails, from the stored water mass m in the particulate filter and from the required temperature change dT, namely, $Q(i)=c*m*dT$. In this context, the index i indicates the calculation step.

The energy requirement for a change in the aggregate state can be expressed as the product of the melt enthalpy q(s) or of the evaporation enthalpy q(v) and of the water mass m in the particulate filter: $Q(i+1)=q(s,v)*m$.

The energy required for the state change amounts in total to $Q_{TOT}=Q(i)+(i+1)$.

Moreover, the energy required for heating the particulate filter itself is calculated and added to the energy required for the state change. These calculations are carried out in parallel for all state changes from solid to liquid or from liquid to gaseous. In case of icing of the particulate filter, the calculation of the required energy is employed and set as the threshold value. As soon as this threshold value has been reached, it can be assumed that no ice or water in liquid form is present in the particulate filter and the discharge can continue to be calculated again in the normal manner.

A processing of the water in its momentary state in the particulate filter can be carried out systematically. The measures carried out in this process can be selected explicitly in such a way that they determine, for example, only the discharge of ice and water in liquid form and, all in all, they are not active any longer than necessary.

BRIEF DESCRIPTION OF THE DRAWINGS

There are numerous possibilities for configuring and refining the method according to the invention in an advantageous manner. In this context, reference is hereby made to the claims that are subordinate to claim 1. Below, a preferred embodiment of the invention will be explained in greater detail with reference to the drawing and to the accompanying description. The drawing shows the following:

FIG. 1 is a highly schematic internal combustion engine with an exhaust gas system, FIG. 2 is a diagram showing the quantity of water in solid form and in liquid form in the gasoline particulate filter of the exhaust gas system, plotted over time.

DETAILED DESCRIPTION OF THE INVENTION

FIG. 1 shows an internal combustion engine 1 having an exhaust gas system 2. The exhaust gas system has a first lambda sensor 4 downstream from the cylinder 3, a catalytic converter 5—especially a three-way catalytic converter (TWC) 5—further downstream, a second lambda sensor 6 further downstream, and a first temperature sensor 7 further downstream, a gasoline particulate filter (OPF) 8 further downstream, and a second temperature sensor 9 downstream from the gasoline particulate filter 8.

The first temperature sensor 7 is arranged upstream from the gasoline particulate filter 8 while the second temperature sensor 9 is arranged downstream from the gasoline particulate filter 8. By measuring the temperature of the exhaust gas flow 2 upstream from the gasoline particulate filter 8 and downstream from the gasoline particulate filter 8, it is possible to determine how much thermal energy has been withdrawn from the exhaust gas by the gasoline particulate filter and from the water contained therein. With the present method, the quantity of water present in the gasoline particulate filter 8 can be determined and differentiated in terms of its aggregate states. This determination is carried out continuously.

When the car is started for the first time after being manufactured or after a new gasoline particulate filter has been installed, then there is initially no water in the gasoline particulate filter. From that point onwards, the physical boundary conditions for feeding and discharging water are calculated on the basis of the values provided by the two temperature sensors 7, 9.

In the method, the aggregate states of the water present in the gasoline particulate filter 8 are determined. By drawing up a balance of the heat quantity, the water values can be associated and converted into each other. When the vehicle is parked, preferably the parking duration is determined. This parking duration is likewise taken into account for determining the quantity of water in the gasoline particulate filter 8 and also for determining the aggregate state of the water in the gasoline particulate filter 8. This also takes into account prolonged cooling phases in which changes in the aggregate state can take place. As another parameter for determining the aggregate states, the ambient temperature is preferably measured with a sensor (not shown here).

If the ambient temperature is, for example, below 0° C. and if a prolonged parking duration has been detected, then it can be assumed that the water in the gasoline particulate filter 8 will have frozen.

In FIG. 2, the quantity of water is now in the solid aggregate state, that is to say, in ice form, and in the liquid aggregate state, as plotted in curves 10 and 11 respectively. At first, all of the water in the gasoline particulate filter 8 is in the frozen state. Over the course of time, a growing portion of the ice liquefies until finally all of the water is present only in liquid form. After further heating, the liquid water evaporates and makes a transition to the gaseous state, a process in which it is discharged from the gasoline particulate filter 8 via the exhaust gas flow 2. These three phases of the water, namely, solid, that is to say, in ice form, liquid and gaseous, are simulated as a model on the basis of the energy considerations presented above. In this manner, the detection of icing of the gasoline particulate filter 8 is improved.

LIST OF REFERENCE NUMERALS 1 internal combustion engine
2 exhaust gas system
3 cylinder
4 lambda sensor
5 catalytic converter (TWC)
6 lambda sensor
7 temperature sensor
8 gasoline particulate filter (OPF)
9 temperature sensor 10 quantity of ice in the gasoline particulate filter
11 quantity of liquid water in the gasoline particulate filter

The invention claimed is:

1. A method for detecting an icing of a particulate filter comprising:
   determining a temperature of an exhaust gas flow flowing through the particulate filter,
   detecting the icing of the particulate filter on a basis of the determined temperature of the exhaust gas flow,
   determining an upstream temperature of the exhaust gas flow upstream from the particulate filter and a downstream temperature of the exhaust gas flow downstream from the particulate filter,
   determining, on a basis of a measured temperature difference between the upstream temperature of the exhaust gas flow upstream from the particulate filter and the downstream temperature of the exhaust gas flow downstream from the particulate filter, a heat input into the particulate filter and a quantity of water present in the particulate filter, and
   calculating an aggregate states of the water present in the particulate filter by drawing up a balance of a heat quantity.

2. The method according to claim 1, further comprising determining an energy requirement for a temperature change until a change occurs in the aggregate state, whereby a product is calculated from a specific thermal capacity of ice or water depending on the aggregate state, from a stored water mass in the particulate filter, and from a required temperature change.

3. The method according to claim 1, further comprising determining an energy requirement for a change in the aggregate state, whereby the energy requirement for the change in the aggregate state is calculated as a product of a melt enthalpy $q(s)$ or of an evaporation enthalpy $q(v)$ and of a water mass min the particulate filter.

4. The method according to claim 1, wherein, in case of icing of the particulate filter, an energy needed to melt the ice is calculated.

5. The method according to claim 1, wherein an energy required for heating the particulate filter is calculated.

6. The method according to claim 1, wherein a volumetric flow through the particulate filter is detected, and the detected volumetric flow used to calculate a heat input.

7. The method according to claim 1, wherein an ambient temperature is determined and the determined ambient temperature is taken into account in the calculation of the aggregate states.

8. The method according to claim 1, wherein a standstill time of a vehicle is determined and the determined standstill time is taken into account in the calculation of the aggregate state.

9. The method according to claim 1, wherein the upstream temperature of the exhaust gas flow upstream from the particulate filter is measured by means of a temperature sensor.

10. The method according to claim 1, wherein the downstream temperature of the exhaust gas flow downstream from the particulate filter is measured by means of a temperature sensor.

11. The method according to claim 1, wherein the upstream temperature of the exhaust gas flow upstream from the particulate filter and/or the downstream temperature downstream from the particulate filter are determined by means of a model.

* * * * *